United States Patent [19]
Samatov et al.

[11] 3,878,912
[45] Apr. 22, 1975

[54] TRACTOR FRAME STRUCTURE

[76] Inventors: Jury Petrovich Samatov, prospekt Lenina, 22, kv. 30; Vladimir Vasilievich Emelyanenko, ulitsa Turistov 106, kv. 39; Nikolai Alexandrovich Litvinov, ulitsa Energetikov, 48, kv. 44; Ivan Savvateevich Kavyarov, prospekt Lenina 15, kv. 20; Vladimir Konstantinovich Kajukov, Diskovy pereulok 32, kv. 21, all of Chelyabinsk, U.S.S.R.

[22] Filed: June 29, 1973

[21] Appl. No.: 374,950

[52] U.S. Cl.......... 180/53 R; 180/9.2 R; 280/106 R
[51] Int. Cl...................... B62d 21/00; B62d 55/00
[58] Field of Search................... 180/9.2, 9.4, 53 R; 280/106

[56] References Cited
UNITED STATES PATENTS

| | | |
|---|---|---|
| 1,173,594 | 2/1916 | McVicker ...................... 280/106 R |
| 2,027,898 | 1/1936 | Broulhiet ...................... 280/106 R |
| 2,901,051 | 8/1959 | Thibodeau ..................... 180/53 R X |
| 3,085,643 | 4/1963 | Schwartz et al................. 180/53 R |
| 3,157,428 | 11/1964 | Kishline ...................... 280/106 R X |
| 3,266,816 | 8/1966 | Peterson et al................. 180/9.4 X |
| 3,645,350 | 2/1972 | Deli et al. .................... 180/9.2 |

*Primary Examiner*—Kenneth H. Betts
*Attorney, Agent, or Firm*—Waters, Roditi, Schwartz & Nissen

[57] ABSTRACT

The tractor has the main frame made up of two lower and two upper longitudinal girders tied together by side and end plates so as to form a frame structure closed round the perimeter. The power and transmission units of the tractor are installed inside this frame, whereas mounted and trailed attachments are secured to the outside thereof.

3 Claims, 5 Drawing Figures

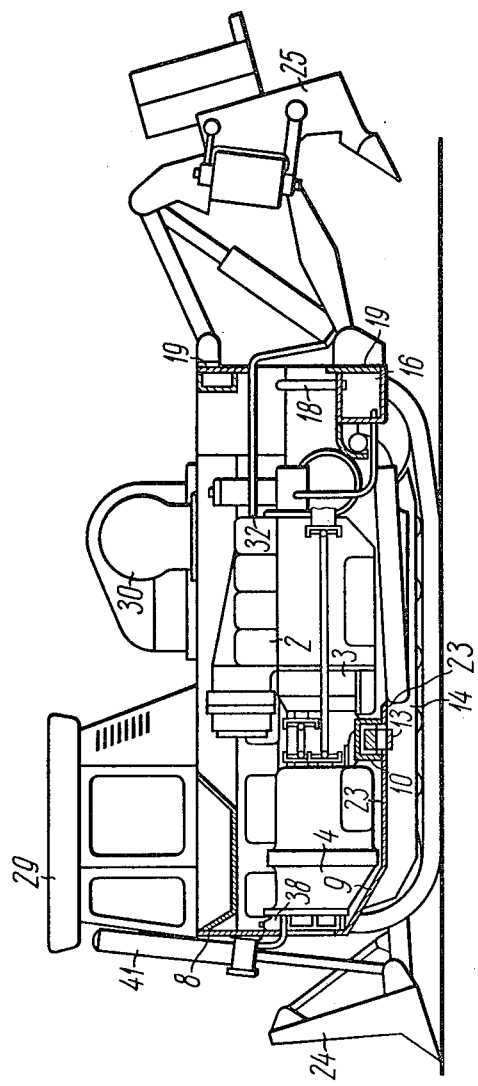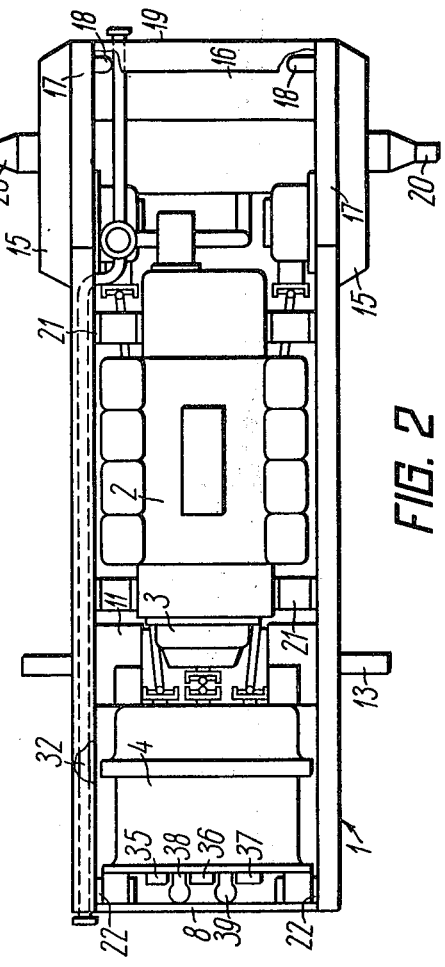

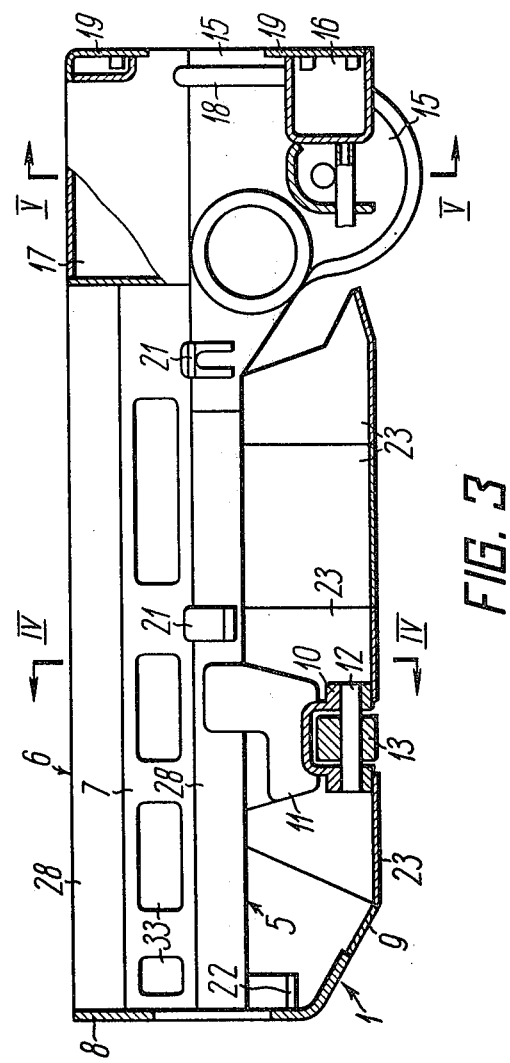

TRACTOR FRAME STRUCTURE

The present invention relates to tractor engineering, more particularly to tractors intended for use in conjunction with various mounted and trailed attachments such as a bulldozer, scarifier, loader or a trailer.

Widely known are tractors the major units of which are mounted on a main frame comprising two longitudinal girders braced up by cross members.

As the longitudinal members and cross members are positioned at a small height, the mounted and trailed attachments are connected to the tractors known hitherto by the use of brackets fixedly secured to the tractor main frame. For example, to mount a bulldozer, a plate carrying brackets has to be installed on the tractor main frame for the bulldozer blade actuating cylinders to be located at the height suitable for their kinematic arrangement.

To mount a scarifier on the rear end of the tractor frame, the height of the frame has to be increased by the use of a bracket.

To carry top-mounted attachments on the tractor main frame, the mounting brackets have to stand above the tractor units installed on the frame.

In the cases where many mounted and trailed attachments are used, the construction of the currently known tractors is unjustifiably complicated by the necessity to employ comparatively bulky and heavy brackets, let alone the cost and labour involved.

Apart from this, the small height of the tractor main frame members makes it necessary to use various guards, cowls and other devices for protecting the tractor units mounted on the main frame.

With all these disadvantages in view, it is an object of the present invention to devise a tractor with a main frame that will provide for convenient installation of mounted and trailed attachments without the use of mounting brackets.

These and other objects are achieved in a tractor in which all the major units are mounted on a main frame comprising two lower longitudinal members braced up by cross members, and two upper longitudinal members, mounted one above each lower longitudinal girder at the topmost height of the tractor major units. The upper longitudinal members are each rigidly secured to the associated lower longitudinal members by side plates, whilst all the longitudinal members are held together by end plates. The members and plates form the main frame closed around the perimeter. The outside surfaces of this main frame serve the purpose of securing mounted and trailed attachments.

This construction permits of securing mounted and trailed attachments to all sides of the main frame as well as to its top, throughout the main height, without using mounting brackets.

The main frame also serves as a guard to accommodate and protect the power and transmission units of the tractor.

It is desirable that all the longitudinal members of the frame be of box cross section and the side plates be attached to the outside of the members so that niches are formed inside the frame between the upper and lower members for the tractor hydraulic piping to be accommodated.

Such a construction ensures sufficient strength of the main frame, while the installation of the tractor hydraulic piping in the frame side niches permits of removing the power and transmission units of the tractor without disturbing the hydraulic piping.

It is also desirable that apertures be provided in the side and end plates of the main frame between the upper and lower longitudinal members for the hydraulic piping and power take-off shafts to pass and for the purpose of giving access to the tractor units located inside the main frame.

Now the invention will be described in detail with reference to the accompanying drawings, in which:

FIG. 1 is a partially cut-away side diagrammatic view of a track-laying tractor carrying mounted attachments (a bulldozer, a scarifier and a winch).

FIG. 2 is a top diagrammatic view of the tractor without the cab and mounted attachments.

FIG. 3 is a longitudinal sectional view of the tractor main frame.

According to the invention, the tractor comprises the main frame 1 (FIGS. 1 and 2) mounted on which are the following tractor units of conventional design: an engine 2, a torque converter and a gearbox 4.

Figure 4:
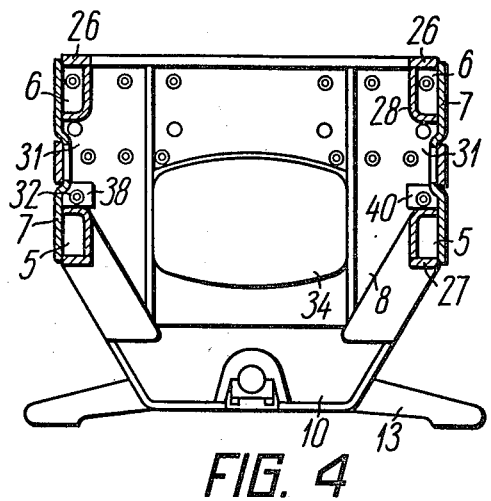
FIG. 4 is a sectional view on the line IV—IV of FIG. 3.
Figure 5:
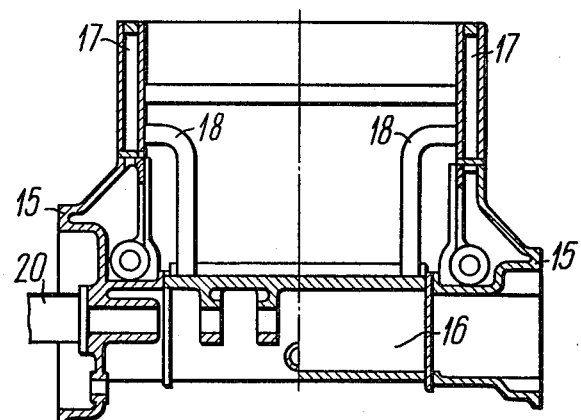
FIG. 5 is a sectional view on the line V—V of FIG. 3.

The main frame 1 is made up of two lower longitudinal members 5 (FIG. 4), two upper longitudinal members 6, mounted one above a each lower longitudinal member at the topmost height of the tractor units (in the embodiment under discussion the upper members are mounted at the topmost height of the engine 2), and vertical side plates 7 which tie up the upper and lower longitudinal members.

All of the longitudinal members 5 and 6 are of box cross section. The front ends of the members (looking in the direction of tractor forward travel) are tied up by a front end plate 8 the lower end of which forms a guard 9.

The lower members 5 of the frame 1 are also secured at the front by a cross member 10 which is attached to said members by means of side brackets 11.

The cross member 10 is essentially a channel bar installed with the open side down. Mounted in the side walls of the cross member 10 is a pivot 12 which carries an equalizer bar 13. The ends of the equalizer bar 13 bear on track roller frame 14 (FIG. 1) of conventional design.

The rear portion of each lower longitudinal 5 forms a final drive housing 15 (FIG. 2). The two final drive housings 15 are secured by a cross member 16 of box cross section. The interior space of the cross member 16 serves as a reservoir for the tractor hydraulic oil.

Provided in the rear portion of each upper member 6 is a compartment 17 which serves as an upper reservoir for the tractor hydraulic oil. Each compartment (reservoir) 17 is connected via a pipeline 18 to the reservoir in the cross member 16, whereby a complete system is formed to hold the required supply of working fluid for the tractor hydraulics.

The final drive housing 15, the cross member 16 and the compartments 17 are tied up by a rear end plate 19 (FIG. 3).

Installed in the final drive housings 15 are axle shafts 20 (FIG. 2) to mount the track carriages 14.

The tractor engine 2 is mounted on four supports 21 attached to the lower longitudinal members 5 inside the main frame 1, in the centre portion thereof. The gearbox 4 is located at the front of the main frame 1 where it is mounted on supports 22 and brackets 11.

Attached to the underside of the lower longitudinal members 5 are guards 23 (FIG. 3) to protect the oil sump and crankcase of the engine 2 and the housings of the torque converter 3 and gearbox 4 against damage from ground irregularities.

The front end plate 8 and rear end plate 19 are provided with apertures for mounting attachments: a bulldozer 24 and a scarifier 25.

According to the invention, the lower longitudinal members 5 and the upper longitudinal members 6 are of box cross section. These members are made up of upper flanges 26 (FIG. 4), lower flanges 27, side plates 7 attached to the outside of said upper and lower flanges, and angle braces 28 which connect the inner sides of the flanges 26 and 27 to the side plates 7. This construction provides adequate strength of the main frame 1.

The upper flanges 26 at the front of the main frame 1 mount a cab 29 (FIG. 1), whereas these flanges at the rear of the main frame 1 mount a winch 30.

The side plates 7 are attached to the outer sides of the lower and upper girders 5 and 6 and form inside the frame 1, between the girders 5 and 6, side niches 31 which accommodates tractor hydraulic lines 32.

This construction permits of removing the engine 2 or other tractor units without demounting the hydraulic lines 32.

To give access to the tractor units located inside the frame 1, the side plates 7 are provided with apertures 33 located between the lower girders 5 and the upper girders 6.

An aperture 34 is provided at the centre of the front end plate 8 for power take-off shafts 35, 36 and 37 (FIG. 2) to pass. This aperture also gives access to hydraulic control units 38 and 39 and to the gearbox 4 so that servicing and repairs thereof can be done readily.

Also provided in the front end plate 8 are apertures 40 for hydraulic lines 32 (FIG. 4) to pass to hydraulic cylinders 41 (FIG. 1).

The tractor constructed in accordance with the present invention has a number of advantages the most distinguished features of which are as follows:-

Attachments can be mounted on the tractor main frame 1 throughout its height, on every side as well as on the top of the main frame, there being no need for mounting brackets.

The tractor hydraulic lines 32 are housed in the side niches 31 provided in the main frame 1.

The tractor units are protected by the side plates 7 of the frame 1, being accessible for servicing by provision of the apertures 33 in said side plates 7.

The frame 1 possesses high strength and rigidity.

What is claimed is:

1. A tractor for use with a plurality of mounted and trailed attachments having a frame mounting all principal assemblies of the drive of said tractor and comprising, two lower longitudinal girders of said frame coupled fixedly together by a cross member; two upper longitudinal girders of said frame, each of which is mounted above a respective lower longitudinal girder at the topmost level of said tractor assemblies; side plates connecting each of said upper girders to its respective lower longitudinal girder; end plates interconnecting all said upper and lower longitudinal girders at the ends thereof and forming together with said side plates and said longitudinal girders a closed-perimeter rigid main frame, the outer surfaces of said main frame, including the top surface, providing carrying means for mounting trailed and mounted attachments.

2. A tractor as claimed in claim 1, wherein all said longitudinal girders are channel-shaped, side plates being attached thereto on the outside to form side niches for the tractor hydraulic piping inside the frame, between said lower and upper girders.

3. A tractor as claimed in claim 1, wherein the side and end plates of the frame have apertures between the upper and lower longitudinal girders, through which hydraulic piping is passed to the hydraulic cylinders of mounted and trailed attachments, and through which said assemblies located inside said frame are serviceable.

* * * * *